US008297525B1

(12) United States Patent
Bolivar

(10) Patent No.: US 8,297,525 B1
(45) **Date of Patent: *Oct. 30, 2012**

(54) DIGITAL CONTROL SYSTEM FOR TANKLESS WATER HEATER ASSEMBLY

(75) Inventor: Luis Bolivar, Miami, FL (US)

(73) Assignee: Niagara Industries, Inc., Miami, FL (US)

(*) Notice: Subject to any disclaimer, the term of this patent is extended or adjusted under 35 U.S.C. 154(b) by 720 days.

This patent is subject to a terminal disclaimer.

(21) Appl. No.: 12/490,500

(22) Filed: Jun. 24, 2009

Related U.S. Application Data

(63) Continuation-in-part of application No. 12/177,686, filed on Jul. 22, 2008, now Pat. No. 8,150,246.

(51) Int. Cl.
*G05D 15/00* (2006.01)
*F24H 1/10* (2006.01)

(52) U.S. Cl. ....................... 236/20 R; 392/490; 392/488

(58) Field of Classification Search ................ 236/20 R; 702/183; 700/295, 300; 392/488, 490; 219/494, 219/487

See application file for complete search history.

(56) References Cited

U.S. PATENT DOCUMENTS 5,408,578 A * 4/1995 Bolivar ......................... 392/490
8,150,246 B1 * 4/2012 Bolivar ......................... 392/485

FOREIGN PATENT DOCUMENTS

JP 2000193314 A * 7/2000
JP 2009036489 A * 2/2009

* cited by examiner

*Primary Examiner* — Chen Wen Jiang
(74) *Attorney, Agent, or Firm* — Albert Bordas, P.A.

(57) ABSTRACT

A digital control system for a tankless water heater assembly designed to heat water on a continuous basis as it passes from a conventional water source and through a heating system. The digital control system comprises a display capable of displaying at least three display modes. The first display mode displays a power setting in the form of a bar graph, and real-time voltage used and efficiency in percentage form. The second display mode displays kilowatt usage and percentage draw. The second display mode is defined as a "generator mode" because a generator unit displays actual kilowatts the tankless water heater assembly is using. While in the second display mode, a user can manually adjust the kilowatts to be used. The third display mode displays amperage draw and actual power usage in percentage form.

14 Claims, 5 Drawing Sheets

DIGITAL CONTROL SYSTEM FOR TANKLESS WATER HEATER ASSEMBLY

OTHER RELATED APPLICATIONS

The present application is a continuation-in-part of pending U.S. patent application Ser. No. 12/177,686, filed on Jul. 22, 2008, which is hereby incorporated by reference.

BACKGROUND OF THE INVENTION

1. Field of the Invention

The present invention relates to control systems for water heaters, and more particularly, to a digital control system for a tankless water heater assembly.

2. Description of the Related Art

The most commonly used digital display units for water heaters only show temperature and have a touch-type control button to raise and lower the temperature. Applicant however is not aware of any digital control systems for tankless water heater assemblies. With regard to tankless water heater assemblies, Applicant believes that the only reference corresponds to Applicant's own U.S. Pat. No. 5,408,578, issued on Apr. 18, 1995 for a tankless water heater assembly. However, it differs from the present invention, because in that patent Applicant taught a tankless water heater assembly, specifically adapted to heat water on a continuous basis as it passes from a conventional water source, into a heat transferring chamber, or chambers, containing immersible high power electrical heating elements.

Other patents describing the closest subject matter provide for a number of more or less complicated features that fail to solve the problem in an efficient and economical way. None of these patents suggest the novel features of the present invention.

SUMMARY OF THE INVENTION

The present invention is a digital control system for a tankless water heater assembly designed to heat a continuous supply of water, comprising display means capable of displaying at least three display modes. The at least three display modes comprise a first display mode, a second display mode, and a third display mode.

The first display mode displays a power setting in the form of a bar graph, and real-time voltage used and efficiency in percentage form. The second display mode displays kilowatt usage and percentage draw. The second display mode is defined as a generator mode because a generator unit displays actual kilowatts a tankless water heater assembly is using. While in the second display mode, a user can manually adjust kilowatts to be used. The third display mode displays amperage draw and actual power usage in percentage form.

The tankless water heater assembly comprises a housing assembly comprising a front panel, a rear panel, first and second lateral panels, and a base panel.

A plumbing assembly comprises at least a cold-water inlet and a hot-water outlet. A heating system comprises at least first and second heating units that house first and second heating elements respectively. The at least first and second heating units each having a top end and a bottom end. The first and second heating units are connected to each other by at least one bypass and at least one pipe. The at least one bypass is positioned at or below the top ends, and the at least one pipe positioned below the at least one bypass. Air entering from the cold-water inlet or the hot-water outlet is expelled via the at least one bypass. Thus, keeping the first and second heating elements continuously submerged within water.

The cold-water inlet has a first threaded fitting and the hot-water outlet has a second threaded fitting. The cold-water inlet and the hot-water outlet are fitted onto the housing assembly. The cold-water inlet has first and second plates that are mounted onto each side of the first lateral panel and the hot-water outlet has third and fourth plates that are mounted onto each side of the second lateral panel.

The plumbing assembly further comprises a flow switch assembly. The electrical system comprises a thermostat assembly that comprises thermal connection means. The thermal connection means provides heat transfer functionality.

An electrical system comprises a thermistor assembly having a thermistor. The thermistor is a heat sensing thermistor, located at the at least one pipe in between the at least first and second heating units. The thermistor assembly has sending means to send a signal to regulate an amount of power delivered to the first and second heating elements under diverse water flow conditions.

It is therefore one of the main objects of the present invention to provide a digital control system for a tankless water heater assembly that comprises a display capable of displaying at least three display modes.

It is another object of the present invention to provide a digital control system for a tankless water heater assembly, whereby the first display mode displays a power setting in the form of a bar graph, and real-time voltage used and efficiency in percentage form.

It is another object of the present invention to provide a digital control system for a tankless water heater assembly, whereby the second display mode displays kilowatt usage and percentage draw.

It is another object of the present invention to provide a digital control system for a tankless water heater assembly, whereby the third display mode displays amperage draw and actual power usage in percentage form.

It is another object of the present invention to provide a digital control system for a tankless water heater assembly that monitors and adjusts the power consumed based on changes in demand of hot water usage and determines the best setting for maximum efficiency.

It is another object of the present invention to provide a digital control system for a tankless water heater assembly that uses a Liquid Crystal Display (LCD) having means to display bar graphs.

It is another object of the present invention to provide a digital control system for a tankless water heater assembly that provides satisfactory requirements for domestic and commercial use.

It still is another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
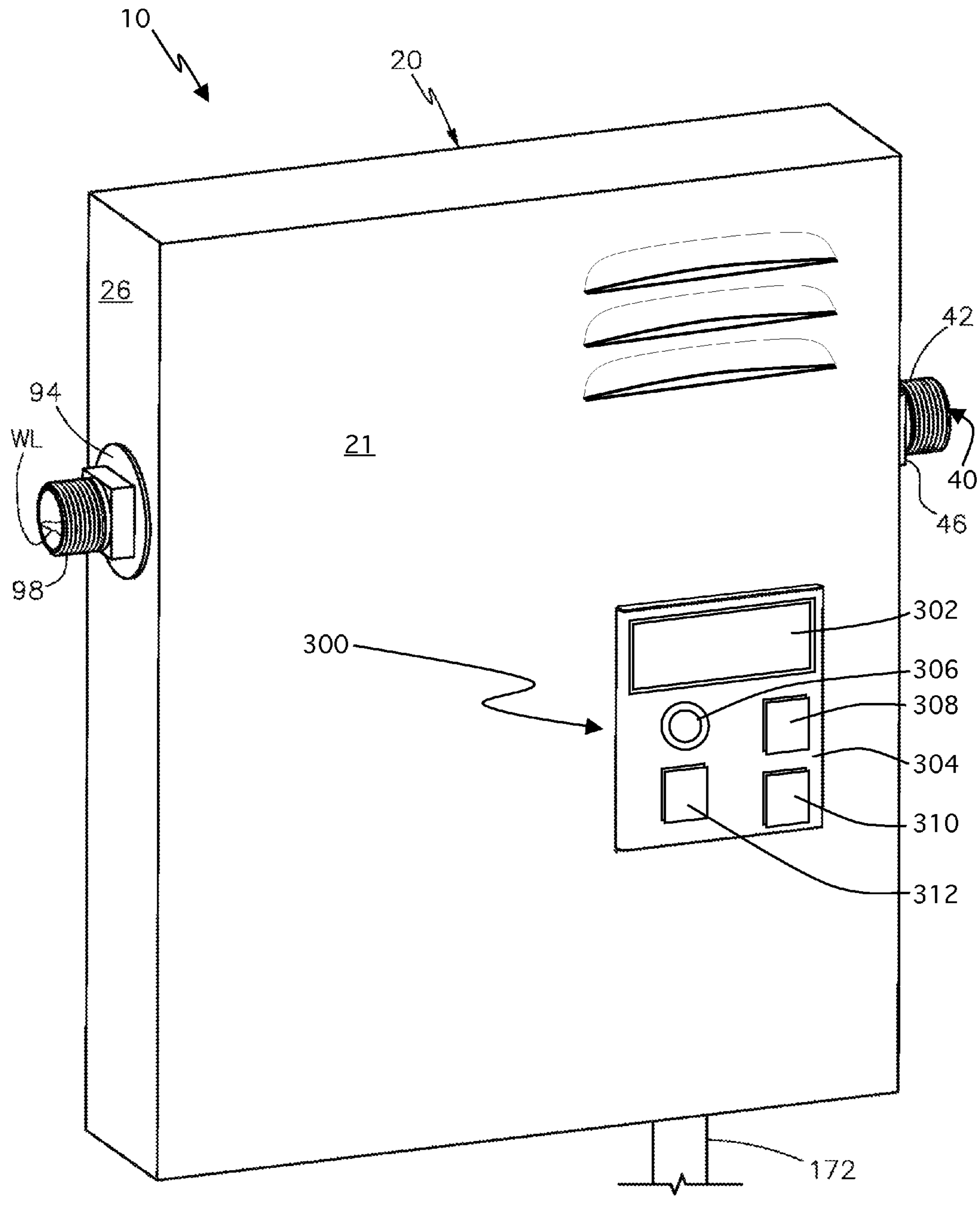
FIG. 1 represents an isometric view of a digital control system installed onto a tankless water heater assembly.

Referring now to the drawings, the present invention is generally referred to with numeral 300.

As seen in FIG. 1, digital control system 300 for tankless water heater assembly 10 comprises a display capable of displaying at least three display modes as display means.

The first display mode displays a power setting in the form of a bar graph, and real-time voltage used and efficiency in percentage form. The second display mode displays kilowatt usage and percentage draw. The second display mode is defined as a "generator mode" because a generator unit displays actual kilowatts tankless water heater assembly 10 is using. While in the second display mode, a user can manually adjust the kilowatts to be used. The third display mode displays amperage draw and actual power usage in percentage form.

Digital control system 300 for tankless water heater assembly 10 monitors and adjusts power consumed, based on changes in hot water usage demand and determines an optimum setting for maximum efficiency. Computer code enables digital control system 300 to perform as stated above. In the preferred embodiment, the display is a Liquid Crystal Display 302 (LCD) having means to display bar graphs. Digital control system 300 also comprises panel 304 on which power switch 312, light-emitting diode 306, and water temperature switches 308 and 310 are mounted thereon. Power switch 312 operates tankless water heater assembly 10. Light-emitting diode 306 illuminates when tankless water heater assembly 10 is "on". Water temperature switch 308 is activated to increase water temperature, and water temperature switch 310 is activated to decrease water temperature.

Figure 2:
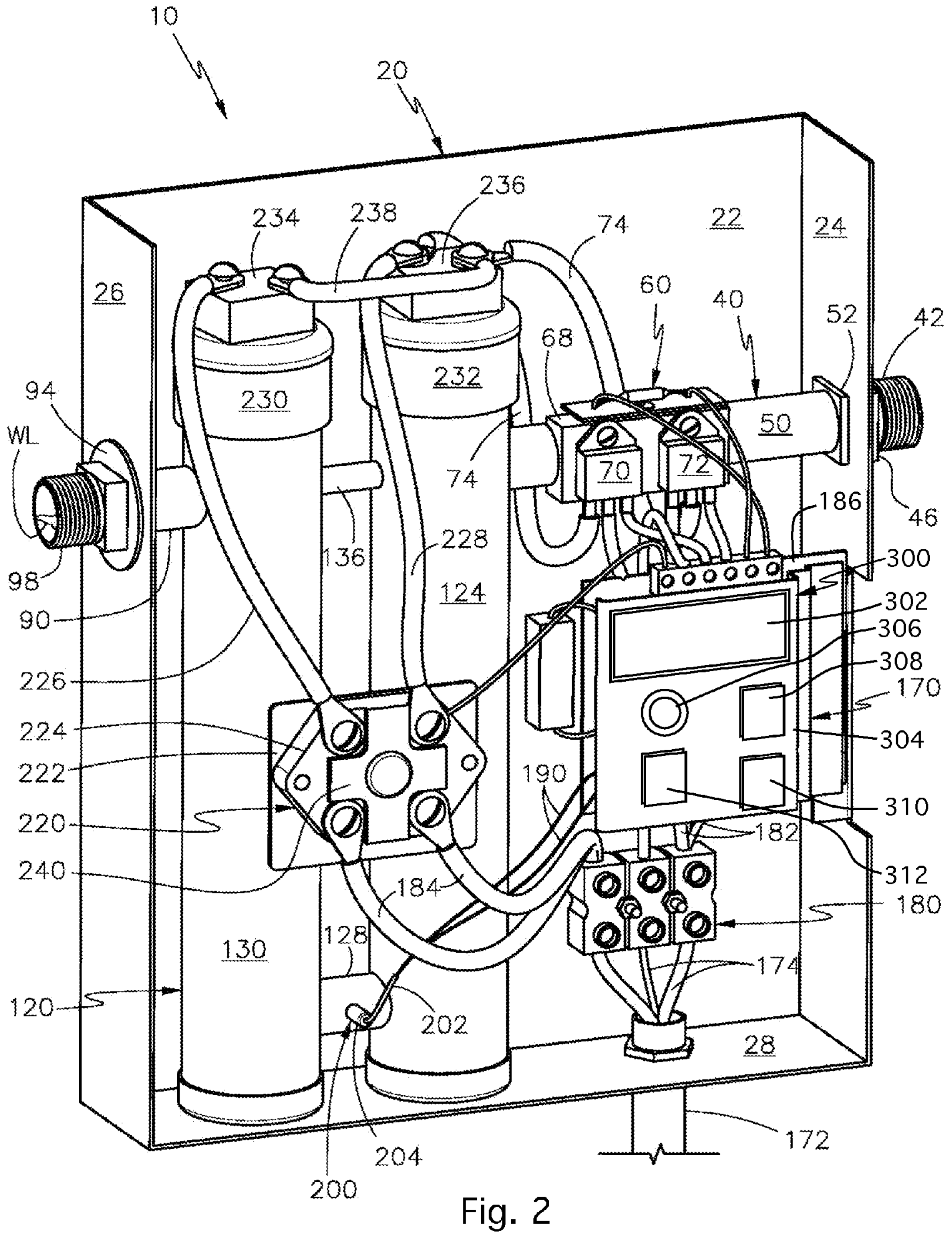
FIG. 2 is an isometric view of the tankless water heater assembly without its front panel.

As illustrated in FIGS. 1 and 2, in the preferred embodiment tankless water heater assembly 10 is directed to a continuous flow water heater and it basically includes housing assembly 20, plumbing assembly 40, heating system 120, and electrical system 170. More specifically, it includes an outer casing or housing assembly 20 that surrounds components shown and to be described in greater detail hereinafter. Housing assembly 20 comprises front panel 21, rear panel 22, lateral panels 24 and 26, and base 28. Front panel 21 may be opened or removed to facilitate minimal access to the components and to effect at least minimal repairs. However, it should be emphasized that the structure and integrity of the components of the tankless water heater assembly 10 minimizes the necessity for entering into the "guts" to accomplish major repairs.

Figure 3:
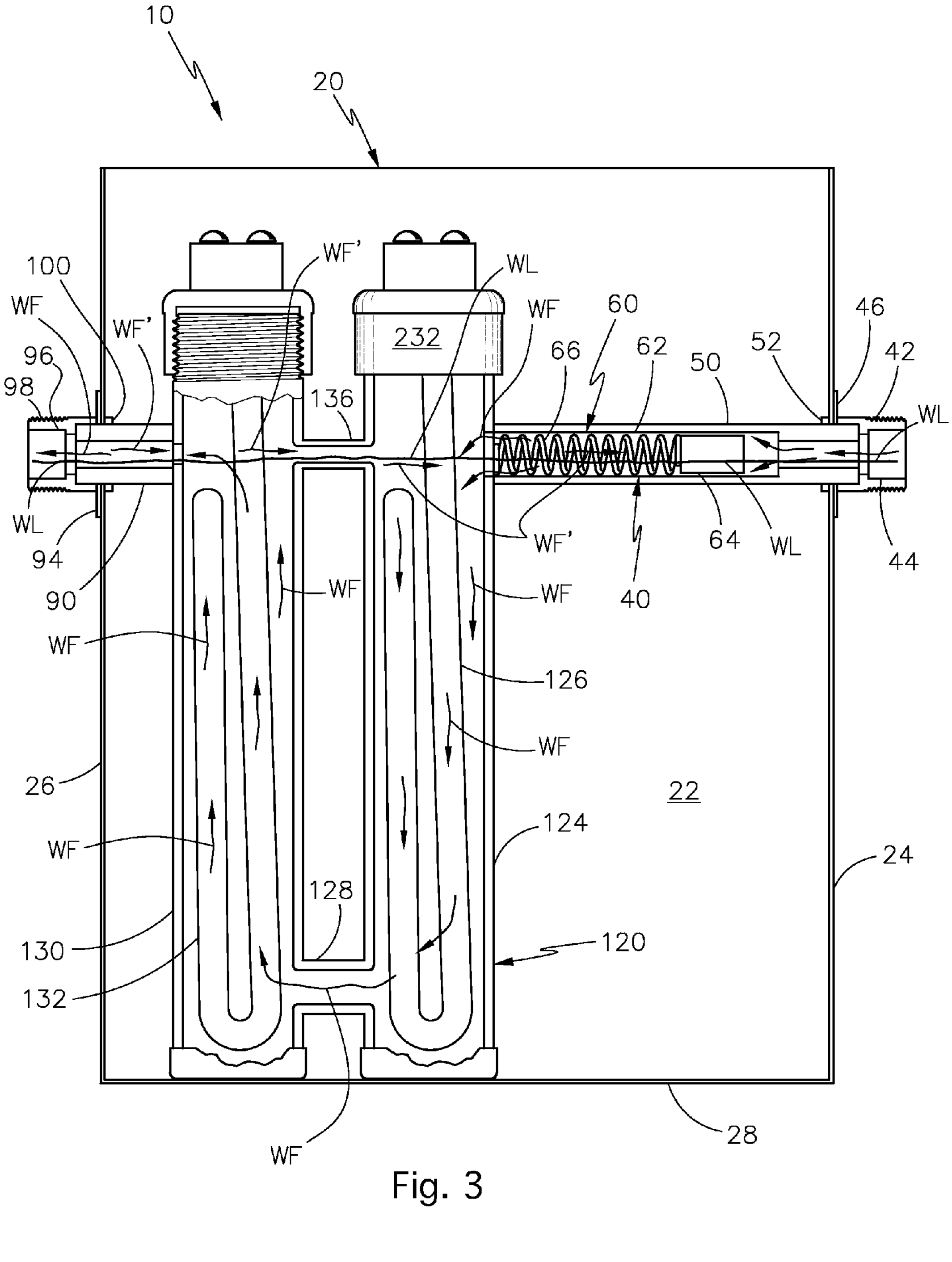
FIG. 3 is a front elevational view of the tankless water heater assembly, which has been partially cross-sectioned to illustrate the water level and path of water flow through various components.

As better illustrated in FIGS. 2 and 3, plumbing assembly 40 comprises threaded fitting 42, defining a cold-water inlet that is connected to a conventional source of water such as the city or municipal water supply. Threaded fitting 42 includes filtering element 44 in order to eliminate any debris from entering into tankless water heater assembly 10 as best possible. Plates 46 and 52 are mounted onto pipe 50, and on each side of lateral panel 24, to provide better structural integrity for plumbing assembly 40 as it is fitted onto housing assembly 20. It is noted that pipe 50 extends from heating unit 124 and terminates at threaded fitting 42.

Similarly, plumbing assembly 40 also comprises threaded fitting 98, defining a hot-water outlet that is connected to additional plumbing for a domestic or commercial structure. Threaded fitting 98 includes filtering element 96 in order to eliminate any debris from exiting tankless water heater assembly 10 as best possible. Plates 94 and 100 are mounted onto pipe 90, and on each side of lateral panel 26, to provide better structural integrity for plumbing assembly 40 as it is fitted onto housing assembly 20. It is noted that pipe 90 extends from heating unit 130 and terminates at threaded fitting 98.

Furthermore, as defined above, plumbing assembly 40 defines an improved and more reliable method of water pipe connection, whereby threaded fittings 42 and 98, for both the cold-water inlet and the hot-water outlet respectively, are fully integrated onto housing assembly 20, providing better structural integrity without requiring fittings as separate attachments to the housing assembly 20 that require soldering in a production process. Plumbing assembly 40 reduces water leaks, resulting in a dramatic improvement in quality and reliability.

Pipe 50 partially contains flow switch assembly 60. Interior to pipe 50, flow switch assembly 60 comprises flow switch 62 comprising magnet 64 mounted onto spring 66. Flow switch 62 moves in a direction indicated by the numerous directional arrows, defined as water flow WF, indicating a positive path of water flow as it enters through the cold-water inlet, and exits through the hot-water outlet. Flow switch assembly 60 also comprises housing 68 that is mounted onto pipe 50. Housing 68 comprises contacts 70 and 72. Cables 74 extend from contacts 70 and 72 to block 236.

Thermostat assembly 220 comprises thermostat 240. Thermostat 240 is a single protective thermostat. In the preferred embodiment, plate 222, is a central metal plate that thermally connects heating units 124 and 130. The thermal connection provides a heat transfer functionality required by thermostat 240, defining thermal connection means. This feature results in fewer false "safety disconnects", and a more reliable operation of tankless water heater assembly 10.

Figure 4:
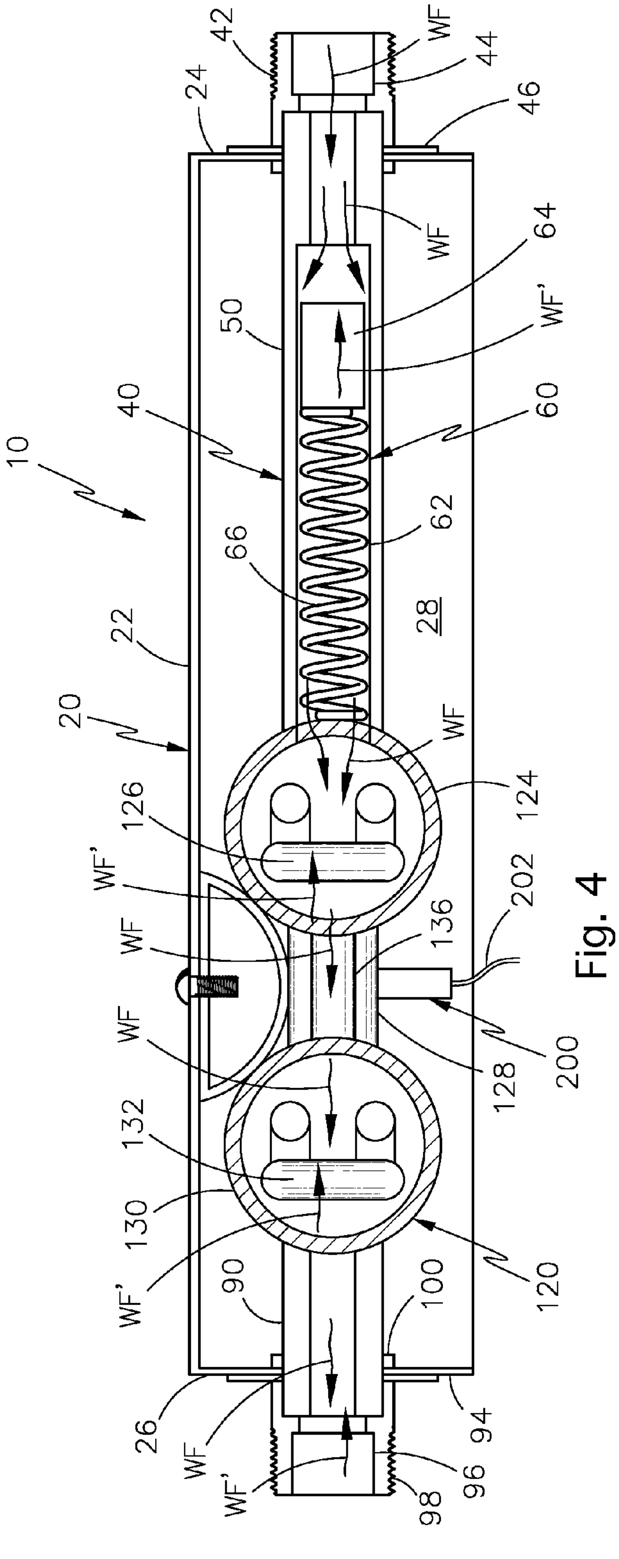
FIG. 4 is a top plan view of the tankless water heater assembly, which has been partially cross-sectioned to illustrate the path of water flow through various components.

As best seen in FIGS. 3 and 4, heating system 120 comprises heating units 124 and 130 that are connected to each other by pipe 128 and bypass 136. Heating unit 124 houses heating element 126 and heating unit 130 houses heating element 132. In the preferred embodiment, pipe 128 is approximately 0.20 inches in diameter. Pipe 128 provides for equal water-pressure within heating units 124 and 130 and keeps them submerged below water level WL, even when the water source has been closed to tankless water heater assembly 10. This feature provides protection for heating elements 126 and 132 from overheating, since water is always present within heating units 124 and 130, thus improving the reliability and safety of tankless water heater assembly 10 and extending the life of heating elements 126 and 132.

Figure 5:
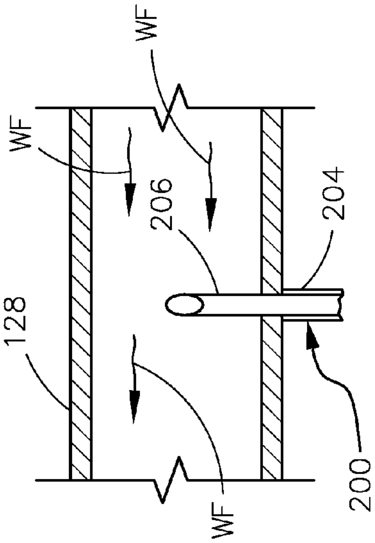
FIG. 5 is a cross-section view showing a thermistor.

As best seen in FIG. 5, thermistor assembly 200 also comprises thermistor 206 that protrudes from lead 202 and more specifically cover 204. Thermistor 206 is a heat sensing thermistor, located at pipe 128 between the heating units 124 and 130 to provide for a better and faster control of the water temperature. Thermistor 206 is inserted into a small opening of pipe 128, and sends a signal, via electrical wiring 190, to control electronic board 186 that regulates the amount of power delivered to the heating elements 126 and 132 under diverse water flow conditions, defining sending means.

Figure 6:
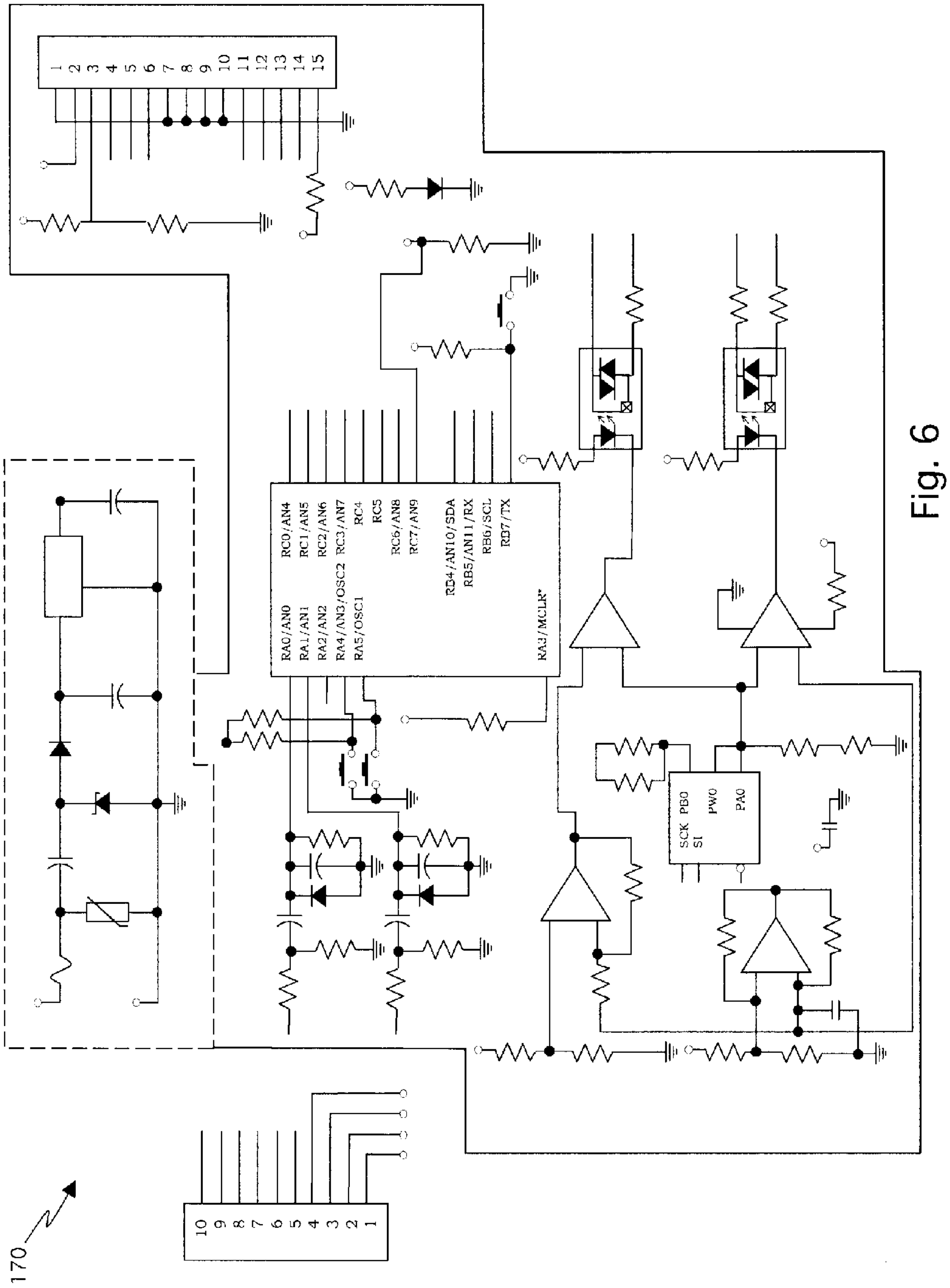
FIG. 6 is an electrical schematic of the digital control system.

As seen in FIGS. 2 and 6, electrical system 170 comprises conduit 172 having electrical wiring 174 that originate from an electrical power source. Electrical wiring 174 connects to terminal block 180, and electrical wiring 182 connects from terminal block 180 to control electronic board 186 having digital control system 300 mounted thereon. Electrical wiring 190 also extends from control electronic board 186 to thermistor assembly 200. Thermistor assembly 200 comprises lead 202 that inserts into cover 204. Cables 184 also extend from terminal block 180 to thermostat block 224 of thermostat assembly 220. Cable 226 extends from thermostat block 224 to block 234 of element terminal 230, and cable 228 extends from thermostat block 224 to block 236 of element terminal 232. Cable 238 connects block 234 to block 236.

Electrical system 170 further comprises a power supply voltage of approximately 6 volts DC regulated; a chip supply voltage of approximately 4.4 volts DC, which results in better regulation; and a main oscillator output level of approximately 800 millivolts at a frequency of 46.5 hertz (21.5 msec). Furthermore, inputs of all operational amplifiers that are not used within the chip are grounded, resulting in a better signal to noise ratio and a more precise control of the temperature of the water. Values of gate resistors of SCR's are also optimized to establish SCR conduction at a "zero crossing" point. In addition, control electronic board 186 has cooperative dimensions to allow easier access to the high voltage terminals, and power rating of a voltage-lowering resistor is approximately 7 W.

Seen in FIG. 6 is an electrical schematic of the digital control system 300, and as seen in the chart below, present invention 300 comprises a combination of electrical components as follows:

| Used | Part Type | Designator | Description |
|---|---|---|---|
| 3 | 0.1 uF, 50 V, 20% | C3 C8 C9 | Capacitor |
| 2 | 1.1 MEG, ¼ W, 1% | R8 R9 | |
| 2 | 1N4001 | VD3 VD4 | Diode |
| 1 | 1N4004 | VD2 | Diode |
| 1 | 1N4740A | VZ1 | Zener Diode |
| 1 | 1 uF 400 V | C1 | Capacitor |
| 1 | 2.2K, ¼ W, 1% | R6 | |
| 1 | 9.1K, ¼ W, 1% | R23 | |
| 3 | 10K, ¼ W, 1% | R5 R10 R11 | |
| 4 | 10 nF, 50 V, 5% | C4 C5 C6 C7 | Capacitor |
| 1 | 32.4K, ¼ W, 1% | R24 | |
| 1 | 37.4, ¼ W, 1% | R31 | |
| 1 | 44.2K, ¼ W, 1% | R30 | |
| 5 | 47K, ¼ W, 1% | R3 R4 R14 R15 R16 | |
| 3 | 69.8K, ¼ W, 1% | R18 R19 R29 | |
| 1 | 91K, ¼ W, 1% | R7 | |
| 2 | 100K, ¼ W, 1% | R20 R22 | |
| 1 | 124K, ¼ W, 1% | R21 | |
| 3 | 220, ½ W, 1% | R1 R27 R28 | |
| 1 | 220 uF 25 V | C2 | Capacitor |
| 1 | VARISTOR 400 V | VR1 | |
| 1 | 431, ¼ W, 1% | R32 | |
| 1 | 470, ¼ W, 1% | R17 | |
| 1 | 500 mA/385 V FUSE | F1 | Fuse |
| 2 | 565, ¼ W, 1% | R25 R26 | |
| 2 | 845K, ¼ W, 1% | R12 R13 | |
| 1 | CON15 (LCD CONN) | J1 | Connector |
| 1 | DOWN (Push Button) | S2 | |
| 1 | LM78L05 | U1 | 100 mA 5 V Linear Regulator |
| 1 | socket 14 pins | U3 | |

-continued

| Used | Part Type | Designator | Description |
|---|---|---|---|
| 1 | socket 8 pins | U4 | |
| 1 | MODE (Push Button) | S3 | |
| 2 | socket 6 pins | U5 U6 | |
| 1 | socket 20 pins | U2 | |
| 1 | POWERCONN | JP1 | Connector |
| 1 | GREEN LED | DACTIVE | |
| 1 | THERMISTOR | RT1 | |
| 1 | UP (Push Button) | S1 | |
| 1 | LCD | | |

In operation, tankless water heater assembly 10 comprises sufficient water to reach water level WL, as seen in FIG. 3. Water flow WF, indicating a positive path of water flow, enters through the cold-water inlet and travels through pipe 50 and primarily through heating unit 124, through pipe 128, through heating unit 130, and exits through the hot-water outlet. However, a small amount of water flow WF also travels through bypass 136. When this occurs, any and all trapped air at the uppermost ends of heating units 124 and 130 is expelled via bypass 136. In addition, water originating from the cold-water inlet may also comprise air that becomes trapped air at the uppermost ends of heating units 124 and 130, and it too is expelled via bypass 136. Bypass 136 allows heating elements 126 and 132 to always be submerged within the water as water flow WF travels continuously through heating units 124 and 130 of heating system 120 to prevent heating unit burnout.

It is emphasized that a siphoning effect is caused when water from the cold-water inlet or the hot-water outlet is turned off, or when a pipe breaks, defining back flow WF', seen in FIGS. 3 and 4. In tankless water heater assembly 10, water flow WF' only travels through bypass 136, and not through heating units 124 and 130, to keep heating elements 126 and 132 submerged within the water. Without bypass 136 of tankless water heater assembly 10, back flow WF' would cause water to be sucked out of heating units 124 and 130 by vacuum pressure. Such back flow WF' would expose heating elements 126 and 132, since they would not be submerged within water, and would cause heating units 124 and 130 to burnout if the tankless water heater assembly 10 is dry started if there is an air bubble coming into it due to a rupture in the cold-water inlet or an interruption of water flow WF.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A digital control system for a tankless water heater assembly designed to heat a continuous supply of water, comprising:

A) display means capable of displaying at least three display modes, said at least three display modes comprise a first display mode, a second display mode, and a third display mode, said first display mode displays a power setting in the form of a bar graph, and real-time voltage used and efficiency in percentage form, said second display mode displays kilowatt usage and percentage draw, said second display mode is defined as a generator mode because a generator unit displays actual kilowatts a tankless water heater assembly is using, while in said second display mode, a user can manually adjust kilowatts to be used, and said third display mode displays amperage draw and actual power usage in percentage form;

B) a housing assembly;

C) a plumbing assembly comprising at least a cold-water inlet and a hot-water outlet;

D) a heating system comprising at least first and second heating units that house first and second heating elements respectively, said at least first and second heating units each having a top end and a bottom end, said first and second heating units are connected to each other by at least one bypass and at least one pipe, said at least one bypass positioned at or below said top ends and said at least one pipe positioned below said at least one bypass, said at least one bypass, said at least a cold-water inlet and said hot-water outlet are all on a same axis; and E) an electrical system.

2. The digital control system for a tankless water heater assembly designed to heat a continuous supply of water set forth in claim 1, further characterized in that air entering from said cold-water inlet or said hot-water outlet is expelled via said at least one bypass, thus keeping said first and second heating elements continuously submerged within water.

3. The digital control system for a tankless water heater assembly designed to heat a continuous supply of water set forth in claim 2, further characterized in that said electrical system comprises a thermistor assembly having a thermistor.

4. The digital control system for a tankless water heater assembly designed to heat a continuous supply of water set forth in claim 3, further characterized in that said thermistor is a heat sensing thermistor, located at said at least one pipe in between said at least first and second heating units.

5. The digital control system for a tankless water heater assembly designed to heat a continuous supply of water set forth in claim 4, further characterized in that said thermistor assembly has sending means to send a signal to regulate an amount of power delivered to said first and second heating elements under diverse water flow conditions.

6. The digital control system for a tankless water heater assembly designed to heat a continuous supply of water set forth in claim 1, further characterized in that said housing assembly comprises a front panel, a rear panel, first and second lateral panels, and a base panel.

7. The digital control system for a tankless water heater assembly designed to heat a continuous supply of water set forth in claim 6, further characterized in that said cold-water inlet has a first threaded fitting and said hot-water outlet has a second threaded fitting, said cold-water inlet and said hot-water outlet are fitted onto said housing assembly.

8. The digital control system for a tankless water heater assembly designed to heat a continuous supply of water set forth in claim 7, further characterized in that said cold-water inlet has first and second plates that are mounted onto each side of said first lateral panel and said hot-water outlet has third and fourth plates that are mounted onto each side of said second lateral panel.

9. The digital control system for a tankless water heater assembly designed to heat a continuous supply of water set forth in claim 8, further characterized in that said plumbing assembly further comprises a flow switch assembly.

10. The digital control system for a tankless water heater assembly designed to heat a continuous supply of water set forth in claim 9, further characterized in that said electrical system comprises a thermostat assembly.

11. The digital control system for a tankless water heater assembly designed to heat a continuous supply of water set forth in claim 10, further characterized in that said thermostat assembly comprises thermal connection means, said thermal connection means provides heat transfer functionality.

12. A digital control system for a tankless water heater assembly designed to heat a continuous supply of water, comprising:

A) display means capable of displaying at least three display modes, said at least three display modes comprise a first display mode, a second display mode, and a third display mode, said first display mode displays a power setting in the form of a bar graph, and real-time voltage used and efficiency in percentage form, said second display mode displays kilowatt usage and percentage draw, said second display mode is defined as a generator mode because a generator unit displays actual kilowatts a tankless water heater assembly is using, while in said second display mode, a user can manually adjust kilowatts to be used, and said third display mode displays amperage draw and actual power usage in percentage form B) a housing assembly comprising a front panel, a rear panel, first and second lateral panels, and a base panel;

C) a plumbing assembly comprising at least a cold-water inlet and a hot-water outlet;

D) a heating system comprising at least first and second heating units that house first and second heating elements respectively, said at least first and second heating units each having a top end and a bottom end, said first and second heating units are connected to each other by at least one bypass and at least one pipe, said at least one bypass positioned at or below said top ends and said at least one pipe positioned below said at least one bypass, further characterized in that air entering from said cold-water inlet or said hot-water outlet is expelled via said at least one bypass, thus keeping said first and second heating elements continuously submerged within water, said at least one bypass, said at least a cold-water inlet and said hot-water outlet are all on a same axis; and E) an electrical system comprising a thermistor assembly having a thermistor, said thermistor is a heat sensing thermistor, located at said at least one pipe in between said at least first and second heating units, said thermistor assembly has sending means to send a signal to regulate an amount of power delivered to said first and second heating elements under diverse water flow conditions.

13. The digital control system for a tankless water heater assembly designed to heat a continuous supply of water set forth in claim 12, further characterized in that said cold-water inlet has a first threaded fitting and said hot-water outlet has a second threaded fitting, said cold-water inlet and said hot-water outlet are fitted onto said housing assembly, and said cold-water inlet has first and second plates that are mounted onto each side of said first lateral panel and said hot-water outlet has third and fourth plates that are mounted onto each side of said second lateral panel.

14. The digital control system for a tankless water heater assembly designed to heat a continuous supply of water set forth in claim 13, further characterized in that said plumbing assembly further comprises a flow switch assembly, said electrical system comprises a thermostat assembly, said thermostat assembly comprises thermal connection means, said thermal connection means provides heat transfer functionality.

* * * * *